DIFFERENTIAL CONTROL CIRCUIT

Original Filed Feb. 24, 1944 4 Sheets-Sheet 1

INVENTOR
B. M. OLIVER
BY Hugh S. Wertz
ATTORNEY

Feb. 13, 1951 B. M. OLIVER 2,541,276

DIFFERENTIAL CONTROL CIRCUIT

Original Filed Feb. 24, 1944 4 Sheets-Sheet 2

INVENTOR
B. M. OLIVER
BY Hugh S. Wertz
ATTORNEY

Feb. 13, 1951 B. M. OLIVER 2,541,276

DIFFERENTIAL CONTROL CIRCUIT

Original Filed Feb. 24, 1944 4 Sheets-Sheet 3

INVENTOR
B. M. OLIVER
BY Hugh S. Wertz
ATTORNEY

Feb. 13, 1951 B. M. OLIVER 2,541,276

DIFFERENTIAL CONTROL CIRCUIT

Original Filed Feb. 24, 1944 4 Sheets-Sheet 4

INVENTOR
B. M. OLIVER
BY Hugh S. Wertz
ATTORNEY

Patented Feb. 13, 1951

2,541,276

UNITED STATES PATENT OFFICE 2,541,276

DIFFERENTIAL CONTROL CIRCUIT

Bernard M. Oliver, New York, N. Y., assignor to Bell Telephone Laboratories, Incorporated, New York, N. Y., a corporation of New York Original application February 24, 1944, Serial No. 523,721. Divided and this application May 28, 1945, Serial No. 596,239

1 Claim. (Cl. 250—27)

This invention relates to control circuits and more specifically to arrangements of this character responsive to two input signal potentials. This application is a division of application, Serial No. 523,721, filed February 24, 1944.

It is an object of this invention to provide a simple and efficient control circuit for controlling the operation of a relay or other device by two direct voltages, the ratio of the amplitudes of which varies.

It is another object of this invention to provide a novel relay control circuit responsive to two input signal potentials and employing a single two-terminal relay coil in the output thereof, the arrangement being such that certain undesired signal components are suppressed and thus do not cause unwanted operation of the relay.

An illustrative embodiment of the invention and one of its applications will be described below in connection with an automatic tracking radar system wherein it is desired to switch from "automatic" to "manual" tracking upon the failure or fading of normally received incoming echo pulses or when for any reason the incoming echo pulses arrive at such advanced or retarded times that the automatic handling of them for automatic tracking would fail or become inefficient, but it will be obvious that the control circuit of this invention has much broader application than to radar systems.

The heart of the control circuit forming part of the illustrative embodiment comprises two tubes connected so that they have a common cathode resistor and the control elements of the two tubes have applied thereto, respectively, two direct voltages, the ratio of the amplitudes of which varies, the output circuit of one only of the tubes containing a relay coil or other means for utilizing the output current. When the signal voltage of the tube having the relay coil in its output circuit increases with respect to the other signal voltage by a predetermined amount, the load current through the relay increases to an extent sufficient to operate the relay, but if this first-mentioned signal voltage decreases with respect to the other signal voltage, the relay remains deenergized because not sufficient load current passes through its coil to retain it in the operating position. In the specific application of the invention herein described, the two direct potentials are integrated positive halves of alternating potential waves to either or both of which the echo pulses may be added dependent upon the time of their reception with respect to the occurrence of the half waves. An advantage of this circuit is that, as will be described more fully below, the noise or other spurious signal components in the incoming current paths do not cause the relay to operate at times it should not. The relay may be used in circuits to give a visible or audible indication of the tracking condition or produce a switching operation.

The invention will be more readily understood by referring to the following description taken in connection with the accompanying drawings forming a part thereof, in which.

Figures 1, 5:
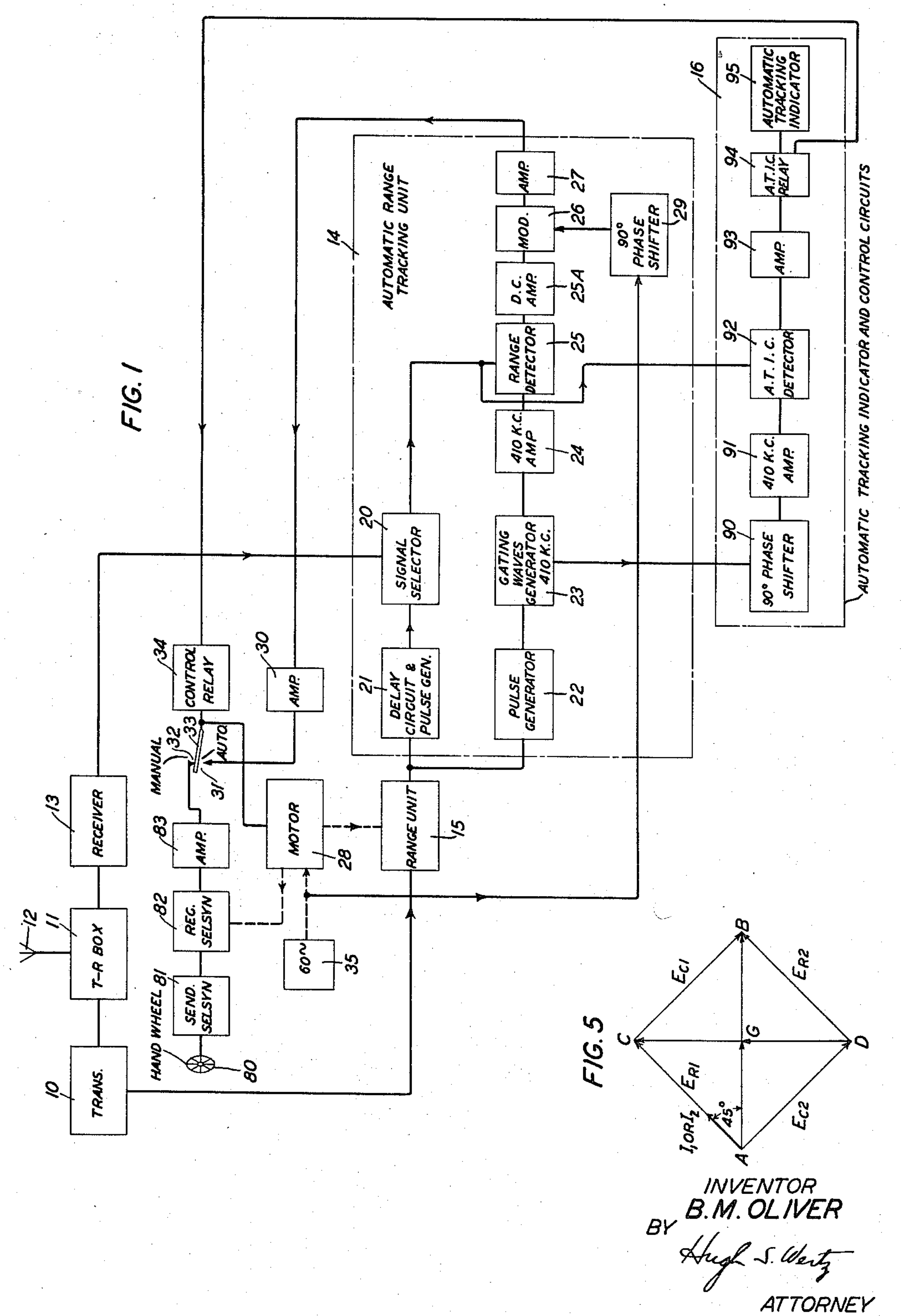
Fig. 1 is a schematic block diagram of a radar system employing a relay control arrangement in accordance with the invention.
Figs. 4 and 5 are diagrammatical and graphical representations to aid in understanding the invention.

Referring more particularly to the drawings, Fig. 1 is a single line block diagram to show the relationship of the various elements of a radar system utilizing a control circuit in accordance with the invention. In the arrangement of Fig. 1, an ultra-high frequency pulse modulated wave is produced in the transmitter 10. The transmitter may comprise, for example, a high voltage rectifier of any suitable form which supplies about 12,000 volts direct current to a suitable charging circuit or element capable of producing a still higher voltage. After the charging voltage builds up to about 21,000 volts, any suitable rotary spark gap discharges the capacitor in the charging circuit. This discharge takes place in about 1 microsecond and causes a magnetron oscillator in the transmitter to oscillate for this brief period and send short pulses of radio frequency energy through a T-R box 11 to an antenna 12 which, for example, includes a wave guide and a parabolic reflector. A suitable antenna is disclosed in an application by A. P. King, Serial No. 499,450 filed August 21, 1943, and in a corresponding British Patent 586,689, complete accepted March 27, 1947. Radiations from the antenna strike one or more objects and produce reflections or echoes therefrom which are received by the antenna 12 and transmitted through the T-R box 11 to the receiver 13. The T-R box can be of any desirable type, for example, that employing a Western Electric Company 709-A tube in a resonant cavity. This tube is filled with an ionizable gas and has a small gap therein. During reception of the low voltages of the received energy, the gas is not ionized, the cavity is tuned to resonance and the received energy is applied to the receiver 13. During the emission of a transmitted pulse from the transmitter 10, the voltage due to the pulse ionizes the gas thus detuning the cavity and substantially preventing the energy of the pulse from reaching the receiver 13.

In the receiver 13 the received waves are heterodyned to a convenient intermediate frequency and these intermediate frequency waves are amplified, detected, and applied to the signal selector 20 in the automatic range tracking unit 14. The unit 14 will be described more fully below.

Figure 4:
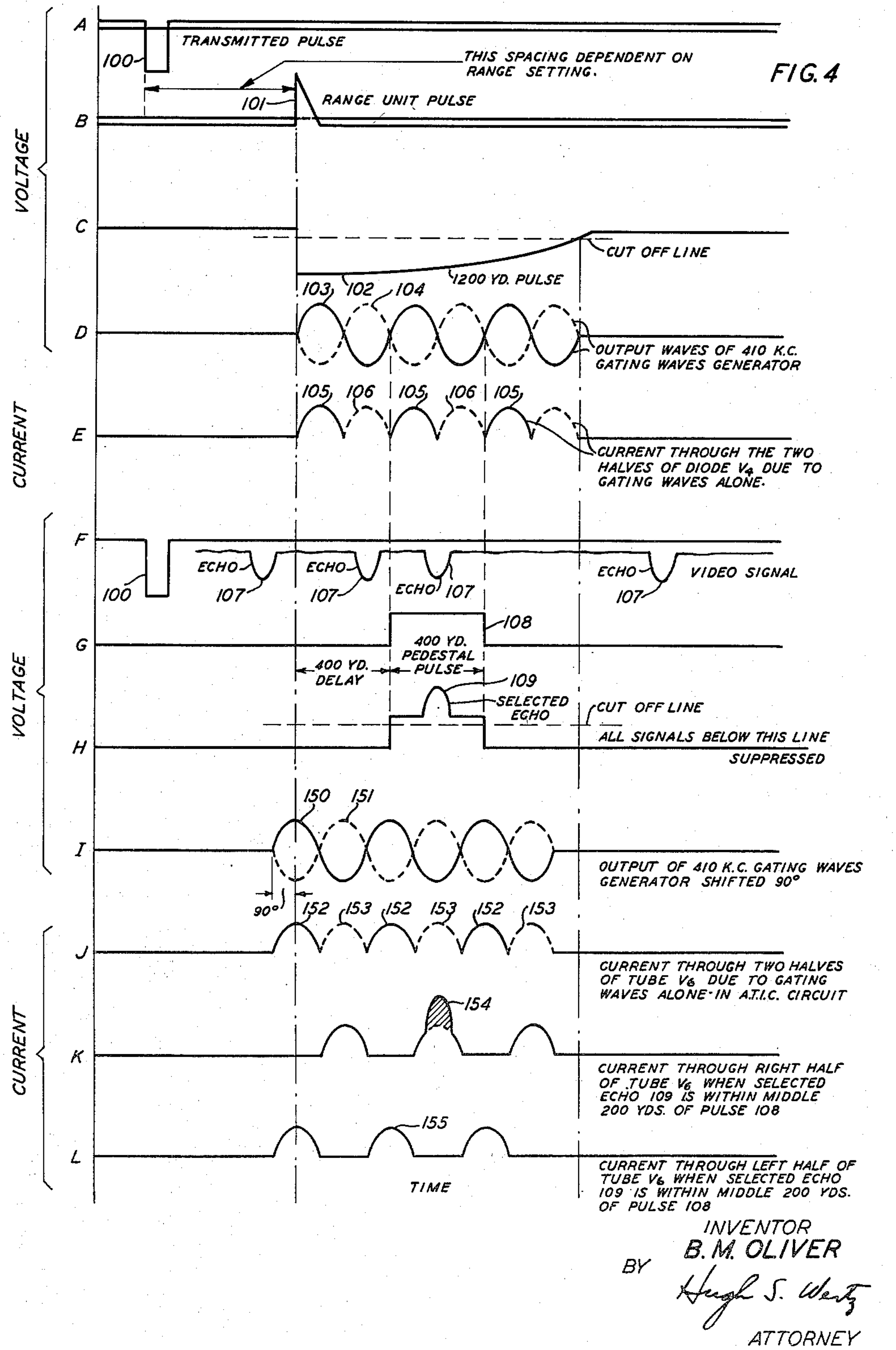

Pulse energy from the transmitter 10, which is in the nature of a synchronizing pulse, controls the range unit 15 which is essentially a variable delay circuit or unit which produces a pulse 101 of predetermined length a controllable period of time after the initiation of the pulse from the transmitter 10 (which is in the same position as, or slightly before or slightly after, the pulse 100 in Fig. 4–A). A suitable range unit is disclosed in an application of L. A. Meacham, Serial No. 491,791, filed June 22, 1943, and which is now U. S. Patent No. 2,422,204. The output pulse from the circuit 15 is applied to a delay circuit and pulse generator 21 which, for example, produces a pulse 108 (see Fig. 4–G) which has a duration corresponding to a range of, for example, 400 yards, the pulse 108 being initiated after a time interval corresponding to a range of 400 yards from the start of the pulse from the range unit 15. A suitable circuit to perform the functions of the unit 21 is disclosed in a copending application of B. M. Oliver, Serial No. 523,722, filed February 24, 1944, and which is now U. S. Patent No. 2,451,632. The output pulse 108 from the delay circuit and pulse generator 21 (see Fig. 4–G) is also fed to the signal selector 20. A suitable signal selector is also shown in the above-mentioned Oliver application.

The output pulse 101 from the range unit 15 is also applied to a pulse generator 22 which produces a negative or notch pulse 102 (shown in Fig. 4–C) which is applied to the gating waves generator 23. The pulse 102 has a time duration corresponding to 1200 yards' range, for example, and this pulse is started by the range unit pulse 101. Fig. 4–D shows two gating waves 103 and 104 which are produced by the generator 23. The waves 103 and 104 are applied to a range detector 25 to which is also applied the selected portion of the video signal from the signal selector 20. This selected signal is represented by the pulse 109 in Fig. 4–H and is produced by applying a wave such as that shown in Fig. 4–F (representing received and detected pulse 100 corresponding to the transmitted pulse, various echoes 107 and noise voltage components) to the signal selector 20 along with the 400-yard positive or pedestal pulse 108. The pulse 108 causes the signal selector 20 to pass current for the duration of this pulse and reject all portions of the signal produced by the receiver 13 which do not occur within the time span of the 400-yard pulse 108. This is represented in Fig. 4–H, the selected echo signal being shown by the pulse 109. In other words, the signal selector 20 has an output current only during the time span of the pulse 108 and the position of this pulse with respect to the pulse 100 is determined by the position of the range unit pulse 101 with respect to the pulse 100. The range detector 25 which will be more fully described below in connection with Fig. 2 comprises two diodes to the plates of which are applied respectively the gating waves 103 and 104 from the amplifier 24 and to the plates of both of which is applied the selected video signal from the circuit 20. Integrating condensers are connected to the cathodes of the diodes and voltages are produced thereacross which are respectively representative of the total current passed by the diodes during the positive halves of the waves 103 and 104 by means which will be described below. If the pulse 109 is not symmetrically postioned in time with respect to the gating waves 103 and 104 (it has been shown as being symmetrically positioned with respect to the middle positive pulses of the waves 103 and 104) a differential current is produced which is utilized to drive a motor 28 to control the range unit 15 in such a way as to vary the position of the range unit pulse 101 shown in Fig. 4–B with respect to the pulse 100 shown in Fig. 4–A. The current used to drive the motor 28 is produced in the modulator 26 to which the signal current from the range detector 25 is applied in addition to 60-cycle waves from the source 35 acting through a phase shifter 29. The output of the modulator 26 which is a 60-cycle wave amplitude-modulated by the signals from the circuit 25 is amplified in the amplifier 27 and applied to the motor 28 through an amplifier 30, contact 31, and armature 33 of the control relay 34 which latter is operated by means of the automatic tracking indicator and control circuit 16 to be described more fully below.

Figure 2:
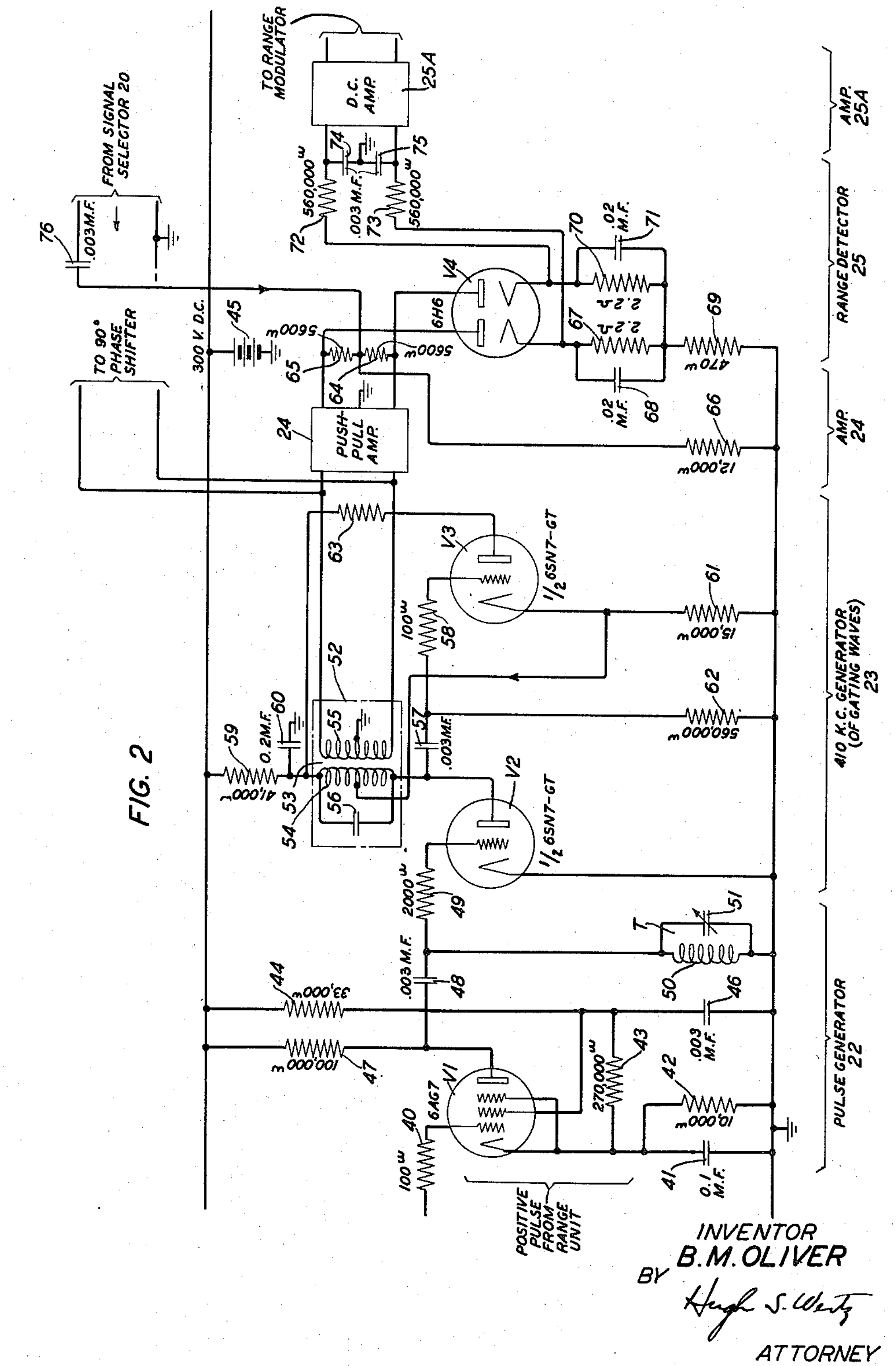
Fig. 2 is a circuit diagram of a portion of the automatic range tracking unit forming part of the system of Fig. 1.

Before describing in detail the circuit 16, a more detailed description of the automatic range tracking unit 14 with reference to Fig. 2 will be given. Fig. 2 shows the pulse generator 22, the 410-kilocycle generator 23 of the two gating waves, amplifier 24, range detector 25 and direct coupled amplifier 25A. The pulse generator 22 comprises a tube V1 to the control grid of which is applied through a resistor 40 the positive pulses 101 (one for each "transmitted pulse" 100) from the range unit 15. The cathode of this tube is connected to the suppressor grid and also to ground through the parallel connected condenser 41 and resistor 42. The cathode is also connected through resistors 43 and 44 to the positive terminal of a source 45 of constant potential of 300 volts, for example. While the source 45 has been represented schematically as a battery, the negative terminal of which is connected to ground, it is to be understood that any other suitable source can be used. The screen grid of the tube V1 is connected through the resistor 44 to the positive terminal of the source 45 and through a condenser 46 to ground. The plate of the tube V1 is connected through the resistor 47 to the positive terminal of the source 45 and through a condenser 48 and a resistor 49 to the grid of the tube V2 in the generator 23. Connected between the common terminal of the condenser 48 and the resistor 49 and ground is a tuned circuit T comprising a parallel connected inductive member 50 and condenser 51, the latter preferably being adjustable and only a few micromicrofarads. The control grid of the tube V1 is biased below cut-off by placing the cathode at a positive potential by means of the resistors 42, 43 and 44, these resistors acting as a voltage dividing potentiometer. When the range unit pulse 101 is applied to the grid of the tube V1, this tube conducts plate current for the instant that the control grid is above the cut-off voltage. The pulse of plate current drawn by V1 during the time of the range unit pulse 101 charges the condenser 51 through the path comprising this condenser, the condenser 48, the plate-cathode resistance of V1, and the condenser 41. This causes the plate voltage to drop about 200 volts and since condenser 48 is much larger than condenser 51, the grid of the tube V2 is driven negative by the same amount. The LC network comprising the members 50 and 51 begins an oscillation which is quenched after one-quarter cycle because the voltage across it begins to swing positive and the grid of tube V2 begins to draw current. The voltage applied to the grid of the tube V2 has the wave form shown in Fig. 4–C. The period of this oscillation can be adjusted by means of the condenser 51 which is adjusted to make the duration of the pulse 102 in Fig. 4–C equal to a period of time equivalent to a 1200-yard range, for example. The large negative grid voltage pulse 102 cuts off the tube V2 for a length of time equal to substantially one-fourth of the period of one oscillation of the network T and produces, by means of apparatus now to be described, plate voltage waves 103 and 104 shown in Fig. 4–D.

Tubes V2 and V3 collectively comprise a generator of the gating waves 103 and 104 which are 180 degrees displaced from each other and are as shown in Fig. 4–D. These waves are sine waves of a frequency of about 410 kilocycles, this frequency being that required to produce three complete cycles within a period of time corresponding to a range of 1200 yards. Associated with tube V2 is the network 52 comprising a transformer 53 having a primary winding 54 and a secondary winding 55. The primary winding 54 is shunted by a condenser 56 and the mid-point of the winding 54 is connected to the cathode of the tube V3, the mid-point of the winding 55 being connected to ground. The winding 54 has one of its terminals connected to the plate of the tube V2 and through a condenser 57 and resistor 58 to the control grid of the tube V3. The winding 54 has its other terminal connected through the resistor 59 to the positive terminal of the direct current source 45 and through a condenser 60 to ground. The terminals of the secondary winding 55 of the transformer 53 are connected to any suitable push-pull amplifier 24. The cathode of the tube V2 is connected to ground and the cathode of the tube V3 is connected through the resistor 61 to ground. A grid leak resistor 62 is connected in the grid-cathode circuit of the tube V3 while the plate of the tube V3 is connected through the resistor 63 to the upper terminal of the winding 54.

The grid of the tube V2 receives the 1200-yard negative pulse 102 from the tube V1. Plate current for the tube V2 normally flows through the transformer winding 54 in the network 52. The voltage pulse 102 applied to the grid of the tube V2 cuts the tube off and the change in plate current of V2 causes the tuned circuit of the net work 52 to oscillate. When the grid voltage of the tube V2 rises above cut-off (after a period of time corresponding to a range of 1200 yards), plate current flows again through V2, and the low plate resistance of this tube damps out the oscillations.

The tube V3 is used to supply feedback to the network 52 of just the proper amount to make up for its losses and thereby maintain a constant amplitude for all cycles in the oscillation. The condenser 51 is adjusted until the duration of the large negative grid voltage wave 102 extending below cut-off of the tube V2 is just long enough to produce three complete oscillation cycles of the network 52 before the oscillations are damped out. The wave forms of these oscillatory waves 103 and 104 are shown in Fig. 4–D.

The voltage waves 103 and 104 produced at the respective terminals of the secondary transformer winding 55 are amplified by any suitable push-pull amplifier 24 and applied respectively to the two plates of the double diode tube V4. Equal resistors 64 and 65 are connected in series across the output terminals of the push-pull amplifier 24 and the common terminal of these two resistors is connected through a resistor 66 to ground. The left cathode of the tube V4 is connected through the parallel connected resistor 67 and condenser 68 and the resistor 69 to ground, while the right cathode of the tube V4 is connected through the parallel connected resistor 70 and condenser 71 and the resistor 69 to ground. The two cathodes are also connected through the series resistors 72 and 73, respectively, to the input terminals of the direct coupled amplifier 25A which is of any suitable form. Equal condensers 74 and 75 are connected across the input terminals of the amplifier 25A, the common terminal of the two condensers being connected to ground. The elements 72 and 74 and 73 and 75 serve as two low-pass filters.

The action of the range detector is as follows: The amplified output waves of the 410-kilocycle generator 23 (such as those shown in Fig. 4–B) are applied to the two plates of the double diode V4. An adjustment can be made in the push-pull amplifier 24 so that the voltages applied to the two plates of the tube V4 are equal when no video signal from the signal selector 20 is applied to the plates of the tube V4. The signal from the signal selector is applied to the common terminal of the resistors 64 and 65 and this is applied equally to the two plates of the double diode tube V4. A coupling condenser 76 can be used in this input circuit if desired. The period of the selected signal shown in Fig. 4–H is, as pointed out above and as shown in Fig. 4, of the proper length of time to correspond to 400 yards range and this 400-yard pulse coincides with the time of the middle cycle of the two 410-kilocycle sine wave oscillations. Once this adjustment is made, the relation between the 400-yard pulse shown in Fig. 4–G with respect to the waves shown in Fig. 4–D remains fixed even though the time of occurrence of all of these may vary with respect to the time of occurrence of the corresponding transmitted pulse 100, this variation being caused by the changes in time of occurrence of the range unit pulse 101 when the apparatus is being utilized to track the selected target.

If no video signal is applied to the plates of the tube V4 from the signal selector 20, the current through the two halves of the double diode V4 will be equal and will appear as two series of positive half sine waves 105 and 106, Fig. 4–E, as each half of the tube V4 conducts alternately. The pulses are integrated by the condensers 68 and 71. The resulting signal voltages are applied to the two grids of a balanced direct current amplifier arrangement represented schematically by the box 25A in Fig. 2 through the filters 72, 74 and 73, 75 and in turn produce equal voltages.

If there is a video signal exactly in the center of the 400-yard pulse shown in Fig. 4–G, its voltage will add equally to the voltage applied to the two sections of the tube V4 to cause increased currents to flow. The currents through the two halves of the double diode V4 will be increased by the same amount so that the two currents will still be equal. As before, this will result in equal signal voltages at the input of the modulator 26.

If the selected echo signal 109 occurs in the first 200 yards of the 400-yard range pulse, one-half of tube V4, say, for example, the right half, will be conducting. The positive voltage of the video signal will add to the voltage on this plate to cause an increase in the flow of current through this diode. The voltage applied to the left plate of the tube V4 will be negative at this instant and the selected signal cannot cause current to flow in this half of the tube. A half cycle later the left plate will be positive and cause current to flow but the video signal will not be present to add to this current so that it will be less than that which flowed in the right half.

If the signal from the target occurs in the second 200 yards of the 400-yard range pulse 108, the current flow through the resistor 67 will be increased while the current flow through the resistor 70 will remain normal. The effect is the reverse of that which takes place under the conditions described in the immediately preceding paragraph. The unequal voltages to ground at these resistors are applied to the input circuits of the balanced direct coupled amplifier 25A and then applied to the modulator 26.

The modulator 26 preferably comprises a bridge structure of four rectifier elements such as that shown in F. A. Cowan Patent 2,025,158, issued December 24, 1935. An alternating current from a suitable source, such as the source of 60-cycle voltage 35, is applied through a 90-degree phase shifting network 29 to one diagonal of the bridge, the other diagonal being connected to the output terminals of the direct coupled amplifier 25A. The modulator 26 operates in accordance with the description in the Cowan patent to suppress the carrier from the source 35 and transmit to the output circuit of the modulator substantially only the upper and lower sidebands produced by the amplitude modulation of this carrier by the signal input. The output wave from the modulator, comprising a 60-cycle, signal-modulated wave, is amplified by the amplifier 27 which may be of the conventional push-pull type and by a second amplifier 30 of any suitable type, one of the output terminals of this latter amplifier being connected to the contacts 31 of the control relay 34. When the control relay 34, in a manner to be described more fully below, is operated to the "automatic" position, the amplifier 30 is connected through the contact 31 and armature 32 of the control relay 34 to a suitable motor 28 which is preferably of the two-phase low inertia type. An unmodulated 60-cycle voltage is applied to the second winding of the motor 28 from the source 35. Since the carrier input to the modulator 26 is shifted 90 degrees by the phase shifter 29, the output of the amplifier 30 will bear a plus or minus 90 degrees phase relation to the fixed phase excitation of the motor depending on the direction of the unbalance which drives the modulator 26. Any unbalance voltage resulting from the received signal not occurring symmetrically with respect to the two gating waves (that is, with respect to the pulses 105 and 106 contained within the span of the 400-yard pulse 108) thereby causes rotation of the armature of the motor 28 which is mechanically connected to the variable delay or range unit 15 to drive a variable condenser forming a part of said unit in one direction or the other. The rotation is in a direction to vary the timing of the output pulse of the range unit in such a way that the gating waves are centered about the received signal 109, reducing the unbalance of the driving voltage to zero. A dial (not shown) on the range unit, calibrated in thousands of yards of range, for example, indicates the delay introduced by unit 15 and is an accurate indication of the range.

It sometimes happens that in the operation of the range tracking unit described above and its associated apparatus, there is a fading in the received signal so that for periods of time there are no signals from the signal selector. In such a situation there is no differential current to drive the motor 28 and accordingly the range unit 15 produces a pulse 101 the time delay of which with respect to the transmitted pulse 100 is not necessarily an accurate measure of the range. Moreover, it might occasionally happen that the selecting 400-yard pulse 108 shown in Fig. 4-G does not span the desired echo signal which condition may exist in initially setting the apparatus for automatic tracking operation or when the apparatus is set into operation again after a period when it has been turned off. In such a situation it is desirable to be able to manually control the operation of the range unit so that the range dial can give an accurate indication of the range to the desired target. A suitable simple manual system has been schematically shown in Fig. 1. In this figure a handwheel 80 is connected to drive the motor 28 through a servo or synchro system comprising a sending Selsyn 81, a receiving Selsyn 82 and an amplifier 83, the connection from the amplifier to the motor 28 being through the manual contact 32 of the control relay 34 and the armature 33 thereof. The motor 28 is geared or otherwise mechanically connected to the rotary armature of the receiving Selsyn 82. In general, the voltage induced in the receiving Selsyn by the turning of the armature and the sending Selsyn because of the movement of the handwheel 80 is not sufficient to produce a torque large enough to drive the range unit so the amplifier 83 and motor 28 serve as a "torque amplifier" for the receiving Selsyn. A suitable servo system involving a sending Selsyn, a receiving Selsyn, a power amplifier and motor is disclosed in an application of E. T. Burton, Serial No. 491,789, filed June 22, 1943, and which is now U. S. Patent No. 2,434,259.

In order to operate the control relay 34 from the manual to the automatic position and vice versa, the automatic tracking indicator and control circuit are provided. The circuit 16 is also provided with an indicator to show when the automatic tracking apparatus is "following" the selected target.

Figure 3:
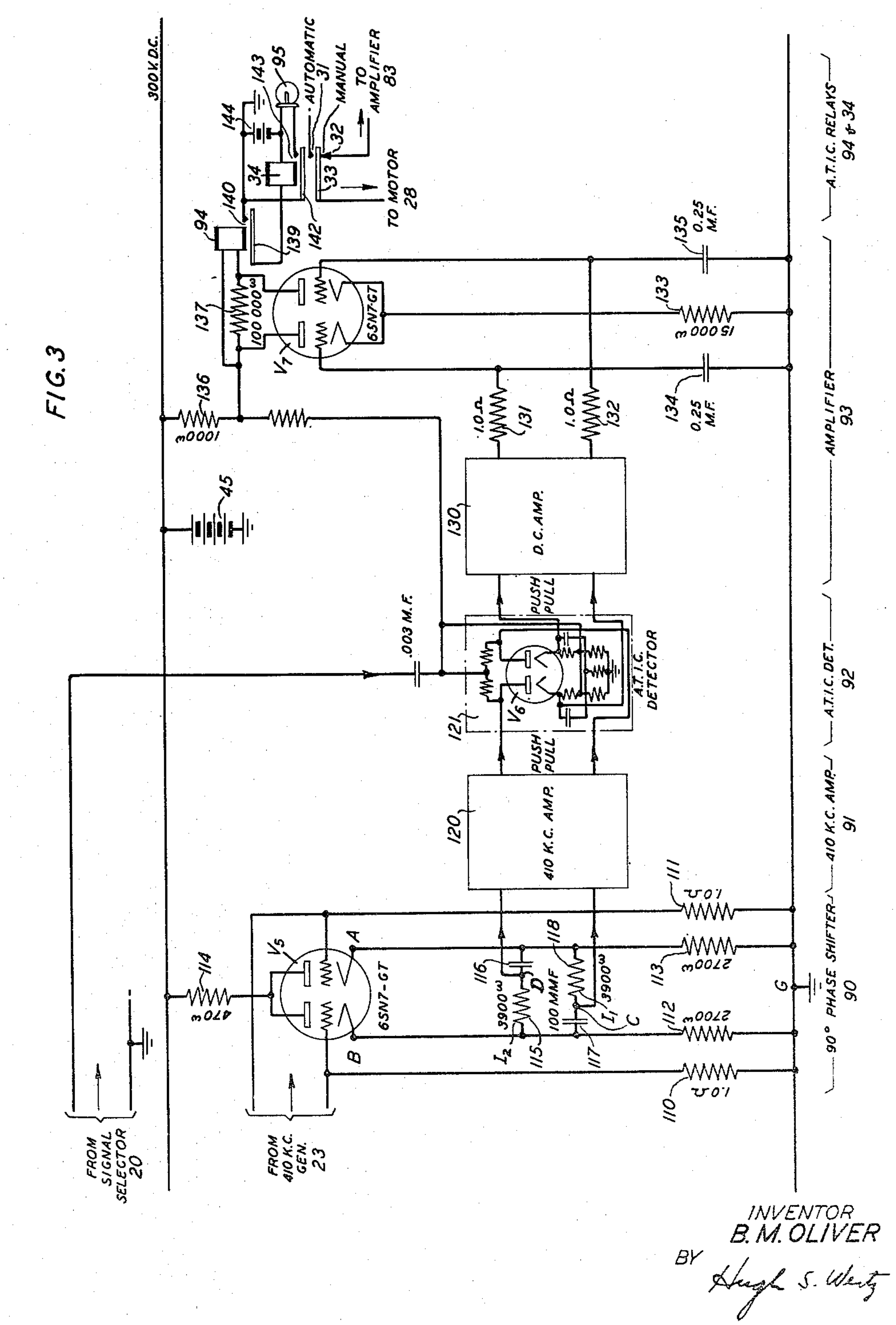
Fig. 3 is a circuit diagram, partly schematic, of the automatic tracking indicator and control circuit forming part of the system of Fig. 1 and including the relay control, double triode tube V7 and its associated connections in accordance with the invention.

The circuit 16 comprises a 90-degree phase shifter 90 for shifting the phase of the gating waves from the generator 23, 90 degrees, an amplifier 91 for these waves, an automatic tracking indicator and control detector 92 (called the A. T. I. C. detector) similar to the double diode tube V4 of Fig. 2, an amplifier 93, an automatic tracking indicator and control relay 94 (called the A. T. I. C. relay) and an automatic tracking indicator 95. Reference will now be made to Fig. 3 for a more a detailed description of the apparatus comprising the circuit 16.

Referring now to Fig. 3, gating waves 103 and 104, shown in Fig. 4-D, at the terminals of the secondary winding 55 of the transformer 53 are applied to the two control grids of the double triode tube V5 which with its associated circuits acts to shift the phase of these two waves by 90 degrees. The two control grids are connected to ground through resistors 110 and 111, respectively, and the two cathodes are connected to ground through resistors 112 and 113 respectively. The two plates are connected to the positive terminal of the direct current source 45 through resistor 114. Connected in parallel between the two cathodes of the tube V5 are two series connected circuits, one comprising the resistor 115 and the condenser 116 and the other comprising the condenser 117 and the resistor 118. The tube V5 serves as a double cathode follower tube to drive the phase shifter, and the outputs of this phase shifter are taken from the points C and D which are the respective common terminals of the two series connected circuits just described. (If desired the tube V5 can be connected between the members 23 and 24 in the automatic range tracking unit 14 to provide a cathode follower output for the generator 24. In such an arrangement the points A and B (the cathodes of the tube V5) are connected to the member 24 and the points C and D connected to the member 91.)

The voltages applied to the tube V5 result in alternating voltages from points A and B to ground which are equal and 180 degrees out of phase with each other. Since this is true, the voltage between points A and B will be twice that of the voltage between either of these points to ground. These voltages are shown in the vector diagram of Fig. 5 by vectors AG and GB and the voltage AB is the sum of these two vectors. In this diagram the point A is used as a reference point and, therefore, the arrows for vectors AG and BG are not shown 180 degrees apart as would be the case if point G or ground were used as a point of reference. The currents $I_1$ and $I_2$ flowing between points A and B by way of parallel paths ACB and ADB, will lead the voltage AB by 45 degrees as shown on the vector diagram, since each of these paths has a resistance (115 or 118) in series with a capacitive reactance of the same magnitude at 410 kilocycles (3900 ohms). The voltage drop $E_{R1}$ across resistor 118 will be in phase with the current $I_1$ as represented by vector AC. The voltage drop $E_{C1}$ across condenser 117 lags behind current $I_1$ by 90 degrees and is represented by the vector CB. The voltage drop $E_{C2}$ across the condenser 116 lags behind current $I_2$ by 90 degrees and is represented by the vector AD. The voltage drop $E_{R2}$ across the resistor 115 is in phase with the current $I_2$ and corresponds to vector DB.

The resulting voltage between C and D is 90 degrees ahead of the voltage AB. On the vector diagram of Fig. 5 the voltage from point C to ground adds to that from point D to ground so that vectors CG and DG are represented by arrows pointing upwards. However, if point G had been used as the reference point instead of point A, the vector GD would have been shown with the direction of the arrow reversed since the voltage from point C to ground is 180 degrees out of phase with that from point D to ground. The vector voltages at points C and D are then 90 degrees ahead of the voltage AB at the cathodes of the tube V5 and the voltage to ground at point C is 180 degrees out of phase with the voltage to ground at point D. The voltages from the points C and D are connected to any suitable push-pull amplifier 120.

These voltages are amplified and inverted by the amplifier 120 and applied to the plates of a double diode tube V6 comprising the A. T. I. C. detector 121, this double diode tube being similar to the tube V4 shown in Fig. 2. Like the arrangement including the tube V4 in Fig. 2, a signal from the signal selector 20 is applied to the two plates of the double diode tube V6. The signal from the signal selector 20 applied to the detector 121 is a positive pulse which raises the voltage of both plates of the double diode by an equal amount. Since the 410-kilocycle gating waves have been shifted 90 degrees in phase by the action of the tube V5 and its associated circuits to become the waves 150 and 151 shown in Fig. 4–I, the right section of the double diode V6, for example, will be conducting during the middle 200 yards of the pulse 108 while the other half of this tube is cut off. Therefore, a video signal occurring within ±100 yards of the center of the 400-yard pulse 108 will cause an additional flow of current in one half of the tube V6 but not in the other half. Fig. 4–J shows the current pulses 152 and 153 through the two halves of V6 due to the gating waves alone, Fig. 4–K shows the current wave 154 through one diode and Fig. 4–L shows the current wave through the other diode when the selected echo 109 is within the middle 200 yards of the 400-yard pulse 108. However, if the signal occurs within 100 yards of either edge of the 400-yard range pulse, an additional flow of current will occur in the other diode, that is, the second or third half sine wave in the wave 155 in Fig. 4–L will be larger (depending on whether the selected echo 109 is near the left or right edge of the pulse 108) while the current in the first half of the diode will remain unchanged.

The voltages in the cathode circuits of the tube V6 are integrated by the condenser connected to them and produce positive signal voltages at the grid of the push-pull direct coupled amplifier 130. If no signal is present within the 400-yard range interval spanned by the pulse 108, these voltages are equal and the amplified voltages applied to the tube V7 are equal. Tube V7, which is the heart of the relay control arrangement of this invention, comprises a double triode, the control grids of which receive the output signals of the direct coupled amplifier 130 through resistors 131 and 132. The cathodes are connected together and through a resistor 133 to ground. The control grids are connected to ground through condensers 134 and 135 respectively. The left anode is connected to the positive terminal of the source 45 through resistor 136 while the right anode is connected to the positive terminal of this source through resistors 137 and 136. The coil of the A. T. I. C. relay 94 is connected across the resistor 137, the relay also having an armature 139 and a contact 140. Under this condition the plate current of the tube V7 is made insufficient to operate relay 94. If the signal is within plus or minus 100 yards of the center of the pulse 108, one grid of the tube V7, say for example, the left grid, is driven in the negative direction. Since the cathodes of the tube V7 have a common resistor 133, this reduction of the current in the left cathode will reduce the bias and increase the plate current in the right section of the tube V7. If the video signal from the signal selector 20 is of sufficient magnitude, this increase in plate current will cause the relay 94 to operate. A signal occurring within 100 yards of either edge of the pulse 108 shown in Fig. 4–G causes an increase in the current through the left half of the tube V7 and a decrease in the current through the right half. Under this condition the plate current that flows through the relay 94 is insufficient to cause it to operate.

An important advantage of the cathode resistor 133 common to the two cathodes of the tube V7 is that the operation of the tube V7 is made dependent substantially only upon the difference of potential between the two input (grid) leads and relatively independent of the average potential of these two leads. Signals which tend to vary the potentials of both leads together (i. e. so-called "longitudinal" signals) are suppressed while signals which tend to vary the potentials of the two leads oppositely (i. e. so-called "transverse" signals) are amplified so that relay 94 is actuated by this latter type of signal to the substantial exclusion of the former. As the relay 94 does not give a true action if these longitudinal signals are large, it is important to suppress them. This suppression is obtained in the present invention even though a simple two-terminal relay coil is provided in the output circuit of one only of the triodes making up the tube V7.

It can be shown that the grid voltage to plate current gain of the tube V7 to longitudinal signals is $$G_L = \frac{g_m}{1+2g_m R} \quad (1)$$

where $g_m$ is the transconductance of either of the triodes of V7 and R is the resistance of the member 133. (The expression neglects the resistance of the relay winding.) The expression for the gain of the tube V7 to transverse signals is $$G_T = g_m$$

The longitudinal suppression ratio is therefore $$\frac{G_T}{G_L} = 1 + 2g_m R$$

If a value of $g_m$ of 2,000 micro-mhos and a value of R of 15,000 ohms are used, it is seen that the longitudinal suppression ratio for this set of assumed values is equal to 61. In other words, the gain of transverse signals is 61 times that of longitudinal signals.

The operation of the relay 94 causes the operation of relay 34. The operation of the relay 34 causes the armature 142 to make contact with the contact 143 which closes the circuit through the direct current source 144 to cause current to pass through the automatic tracking indicator 95 which may be, for example, a device which gives a visible or an audible indication. The operation of the relay 34 also causes the armature 33 to be moved from a position in contact with the contact element 32 to a position in contact with contact member 31, or in other words to actuate the armature 33 from the "manual" to the "automatic" position. The relation of the contact members 31, 32 and 33 to the motor 28 and the amplifier 83 is indicated schematically in Fig. 1. It is obvious that the operation of the A. T. I. C. relay 94 can be used to perform other switching or conditioning operations than those specifically mentioned above. For example, if the radar is one which has automatic antenna tracking such as that, for example, disclosed in the copending application of B. M. Oliver, Serial No. 523,722, filed February 24, 1944, and which is now United States Patent 2,451,632, the energization of this relay may be used to connect for automatic tracking motors driving the antenna through horizontal and vertical angles, while the deenergization of the relay 94 may be utilized to condition the circuit for manual operation of these motors in a manner similar to the operation of the motor 28 by the handwheel control 80.

Circuit constants of a radar arrangement in accordance with the invention which has been actually constructed and satisfactorily operated have been indicated on the drawings. It is to be understood, however, that the invention is not limited to the use of elements having these particular circuit constants nor is the invention limited to use in radar systems. In the drawings, the reference letter "ω" is used in connection with resistances in lieu of the word "ohms" while the reference letter "Ω" is used in the same connection to be representative of the word "megohms."

Although the present invention has been described in terms of a preferred illustrative embodiment, it should be realized that the invention and its several features are susceptible of embodiment in a wide variety of other forms and hence the invention is to be understood as comprehending such other forms as may fairly come within the spirit and letter of the claim.

What is claimed is:

A differential control system for utilizing differences between a first and a second input signal comprising a first and a second source of input signals capable of being continuously variable, a first and a second space current device, each having a plate, a cathode, and a control grid, a first means for connecting the first of said plates to ground through a path which comprises a source of direct potential, a second means for connecting the second of said plates to ground through a path which comprises a load device and a source of direct potential, a third means for supplying a first and a second continuously variable unidirectional signal to the control grids of the first and second devices, respectively, and a fourth means, including a high resistance connected between the cathodes of said two devices and ground, responsive to the first signal for varying the plate current of the second device, said third means and said fourth means cooperating to make the plate current in said second space current device substantially responsive only to differences between the first and second signals.

BERNARD M. OLIVER.

REFERENCES CITED

The following references are of record in the file of this patent:

UNITED STATES PATENTS

| Number | Name | Date |
|---|---|---|
| 2,265,825 | Urtel et al. | Dec. 9, 1941 |
| 2,274,158 | Penther | Feb. 24, 1942 |
| 2,369,081 | Shook et al. | Feb. 6, 1945 |
| 2,416,223 | Sanders | Feb. 18, 1947 |

OTHER REFERENCES

"Review of Scientific Instruments," August 1941, page 412.